(12) United States Patent
Brinkhuis (10) Patent No.: US 8,742,052 B2
(45) Date of Patent: Jun. 3, 2014

(54) POLYUREA COMPOUND

(75) Inventor: Richard Hendrikus Gerrit Brinkhuis, Zwolle (NL)

(73) Assignee: Nuplex Resins B.V., Bergen OP Zoom (NL)

( * ) Notice: Subject to any disclaimer, the term of this patent is extended or adjusted under 35 U.S.C. 154(b) by 1477 days.

(21) Appl. No.: 11/795,095

(22) PCT Filed: Jan. 10, 2006

(86) PCT No.: PCT/EP2006/050134
§ 371 (c)(1),
(2), (4) Date: Oct. 30, 2007

(87) PCT Pub. No.: WO2006/075000
PCT Pub. Date: Jul. 20, 2006

(65) Prior Publication Data
US 2008/0139755 A1 Jun. 12, 2008

Related U.S. Application Data

(60) Provisional application No. 60/654,455, filed on Feb. 22, 2005.

(30) Foreign Application Priority Data

Jan. 11, 2005 (EP) .................................. 05075061

(51) Int. Cl.
| | | |
|---|---|---|
| *C07C 273/18* | (2006.01) | |
| *C07C 275/24* | (2006.01) | |
| *C08G 18/28* | (2006.01) | |
| *C08G 18/72* | (2006.01) | |
| *C09D 5/04* | (2006.01) | |
| *C09D 175/12* | (2006.01) | |

(52) U.S. Cl.
USPC .......................................................... 528/44

(58) Field of Classification Search
USPC ............................................ 525/185; 528/44
See application file for complete search history.

(56) References Cited

U.S. PATENT DOCUMENTS

| | | | |
|---|---|---|---|
| 3,367,920 A | 2/1968 | Wasserman et al. | 260/77.5 |
| 3,620,695 A * | 11/1971 | McCoy | 44/270 |
| 4,165,329 A | 8/1979 | Dreher et al. | 260/404.5 |
| 5,176,907 A * | 1/1993 | Leong | 424/78.08 |
| 8,207,268 B2 * | 6/2012 | Brinkhuis | 525/128 |
| 2002/0166630 A1 | 11/2002 | Bonilla | 156/331.4 |
| 2004/0132934 A1 * | 7/2004 | Grubbs et al. | 526/160 |

FOREIGN PATENT DOCUMENTS

| | | | |
|---|---|---|---|
| WO | WO 98/45458 | * 10/1998 | |
| WO | WO2005/005558 A | 1/2005 | C09D 5/04 |

OTHER PUBLICATIONS

Hwan et al., electronic translation of KR 10-2002-0006612 (Feb. 2002).*
Evans et al., Poultry Science, 28, 691-696 (1949).*
International Search Report and the Written Opinion of the International Searching Authority, mailed Apr. 11, 2006, for PCT International Application No. PCT/EP2006/050134.

* cited by examiner

*Primary Examiner* — Jeffrey Mullis
(74) *Attorney, Agent, or Firm* — Coraline J. Haitjema; David P. Owen; Hoyng Monegier LLP (57) ABSTRACT

A polyurea compound obtainable by reacting one or more polyisocyanates with one or more non-chiral mono-amines (I) and one or more chiral mono-amines (II) and co-precipitating the reaction products to form the polyurea compound, wherein 2-98 mole % of the mono-amines in the polyurea compound are chiral mono-amines. The invention also relates to the use of said polyurea compound as a rheology modification agent, in particular as sag control agent (SCA) in coating compositions. The invention further relates to sag control agent compositions, coating compositions and coatings comprising the polyurea compound as sag control agent.

39 Claims, 4 Drawing Sheets

Figure 1

Figure 2: SEM photograph of SAMBA-HDI

Figure 3: SEM photograph of BA-HDI

Figure 4: SEM photograph of SAMBA/BA-HDI

POLYUREA COMPOUND

This application is a 35 U.S.C. §371 national phase application of International Application Number PCT/EP2006/050134, filed Jan. 10, 2006, and claims priority to European Patent Application No. 05075061.1, filed Jan. 11, 2005, and U.S. Patent Application Ser. No. 60/654,455, filed Feb. 22, 2005, the entire contents of which are incorporated by reference herein.

The invention relates to a polyurea compound obtainable by reacting one or more polyisocyanates with amines and to the use of said polyurea compound as a rheology modification agent, in particular as sag control agent (SCA) in coating compositions. The invention further relates to sag control agent compositions, coating compositions and coatings comprising the polyurea compound as sag control agent.

The use of SCA's in coating compositions is well known. U.S. Pat. No. 4,311,622 discloses thixotropic coating compositions prepared from a binder and a sag control agent, which is the reaction product of a diisocyanate and a monoamine or hydroxy monoamine. Similarly, EP-A-0.261.863 discloses fluidity controlling agents for paints which give thixotropic properties to a coating film when it is applied to the paint and hardly produces sagging in the formation of thick coating films.

However, the performance of conventional rheology control agents is not always sufficient and fairly high amounts may be necessary to get the desired rheological properties, particularly high viscosity at low shear. Also, in some cases (depending on formulation and curing conditions) negative effects on optical appearance as haze or discoloration may result. Accordingly, there is still a desire for rheology control agents with an improved performance so that the amount to be used can be reduced.

According to the invention there is provided a polyurea compound obtainable by reacting one or more polyisocyanates with one or more non-chiral mono-amines and one or more chiral mono-amines and co-precipitating the reaction products to form the polyurea compound, wherein 2-98 mole % of the mono-amines in the polyurea compound are chiral mono-amines.

It has been found that the polyurea compound according to the invention is a very powerful rheology modification agent. In particular it was found that, compared to prior art polyurea compounds comprising only non-chiral mono-amine compounds, even low amounts of chiral mono-amine in the mono-amine mixture result, in a sag simulation test, in a significant decrease in the compliance value, which is considered proportional to the cumulative amount of flow exhibited by a wet coating film at room temperature. Polyurea compounds based on essentially pure chiral amines are described in not pre-published application EP2004/007597 and EP2004/007602. The disadvantage of these compounds is that they are relatively expensive because the chiral compound is expensive. The polyurea compounds according to the invention are not only less expensive but may even have an improved rheology modification efficiency compared to a polyurea based on pure chiral amine.

Due to the increased rheology modification efficiency of the polyurea compound of the invention, the flash-off period flow of a coating composition can be decreased, the viscosity, particular at low shear, can be increased, the rate of viscosity build up can be improved, and/or its response to shear stress or level of dilution, to give good sag control and good leveling under application conditions. The increased rheology modification efficiency can also be used to reduce the amount of rheology modification agent, which results in a cost-saving and may result in improved optical properties of a coating prepared from a coating composition comprising the polyurea compound as sag control agent. In general, the fine structure of the polyurea compounds of this invention contributes to a low haze level.

Even though chiral compounds are relatively expensive, the polyurea compounds according to the invention are very attractive from the economic point of view because considerable rheology modification improvement is already obtained at relatively low chiral mono-amine contents.

A further advantage of the polyurea compound of the invention over the prior art polyurea compounds based on non-chiral mono-amines, is that the high temperature flow is improved, resulting in smoother and more glossy coating surfaces than in prior art polyurea compounds based on non chiral mono-amines. The high temperature flow can be controlled by tuning the chiral mono-amine content.

In a preferred embodiment, the polyurea compound is obtained in a process according to the invention wherein one or more polyisocyanates are reacted with a mixture of one or more non-chiral mono-amines and one or more chiral mono-amines followed by precipitating the reaction products forming the polyurea compound. In such a process a great number of different reaction products can exist. In a preferred embodiment, in which a di-isocyanate is reacted with a mixture of one non-chiral monoamine and one chiral mono-amine, at least 3 different polyurea reaction products are formed. Because the chiral mono-amine has two or more enantiomers, an even larger number of different stereoisomers of said polyurea reaction products is formed. When reacting a tri-isocyanate, a multitude of different reaction products is formed.

In an alternative embodiment, the polyurea compound can be obtained in a process, wherein in step A one or more polyisocyanates are reacted with one or more non-chiral mono-amines and wherein, in a separate step B, one or more polyisocyanates are reacted with one or more chiral mono-amines followed by combining the reaction products of step A and step B and precipitating the combined reaction products to form the polyurea compound.

It is noted that the reaction of an polyisocyanate (R—NC(=O)) with a chiral/non-chiral mono-amine (R*—NH2) results in an urea bond (R*—NC(=O)N—R). As will be clear to person skilled in the art, this urea bond is symmetric and therefore the exact same polyurea compound is also obtainable by reacting a polyamine with the corresponding chiral/non-chiral mono-isocyanate. Therefore the invention also covers the polyurea obtainable by reacting a polyamine with a chiral/non-chiral mono-isocyanate. Unless it is specifically indicated otherwise, in this description both alternatives are implied also when only one of the alternatives is described. It is however preferred to use chiral mono-amines because they are more readily available and less expensive.

The use of the prefix "poly" for polyisocyanates and polyamines indicates that at least two of the mentioned functionalities are present in the respective "poly" compound. It is noted that when a polyurea product is prepared, i.e. the reaction product of amines with a polyisocyanate or the reaction product of isocyanates with a polyamine, it is preferred to prepare a diurea product or triurea product. It is also noted that although a chiral amine or isocyanate is used, the polyurea reaction product that is obtained is not necessarily optically active.

With non-chiral amine is meant an amine covalently bonded to a carbon atom, which carbon atom has two identical substituents such that it is not chiral. For the non-chiral mono-amines, in principle a wide range of different non chiral mono-amines can be used. Suitable non-chiral mono-amines I for example are cyclohexylamine, butylamine, laurylamine, 2-phenethylamine, benzyl amine, methoxypropyl amine, hexyl amine, 3-aminomethyl-pyridyl amine etc. The carbon adjacent to the amine group can have one, two or three (non-hydrogen) substituents, albeit that two of the substituents must be identical such that the carbon atom is non chiral. Preferably, the non-chiral mono-amines are amines having 2 hydrogen atoms on the carbon atom next to the amine group and one substituent R1.

Further, also polyamines can be used to influence the crystallisation behaviour. However, if polyamines are used it is preferred that the polyamines are used next to the mono-amines in a small amount, preferably less than 20, more preferably less than 15, even more preferably less than 10 mole % and most preferably less than 5 mole %. A too high polyamine content can lead to polymerisation and reduction in anti-sagging properties. In PCT/EP2004/007957 (Example 25) a polyurea is described having next to a chiral mono-amine (S-AMBA) about 20% of a non-chiral di-amine. This polyurea does not comprise non-chiral mono-amines. In U.S. Pat. No. 4,165,329 (example 9 and 10) a polyurea compound is described having non-chiral mono-amines and 50 mol % chiral di-amines wherein the chiral centre is, as opposed to the present invention, not on the carbon next to the amine group. The product does not comprise chiral mono-amines. The prior art polyurea compounds have considerably less anti-sag properties even at a considerably higher content of expensive chiral amines. In U.S. Pat. No. 3,367,920 a polyurea compound is described obtained by reacting chiral di-isocyanate and non-chiral diamine. The polyurea does not comprise mono-amines and is in fact a polymer for use as a coating material. US-A_20020166630 describes a polyurea formed from a polyisocyanate, a non-chiral cycloaliphatic diamine and a chiral poly-amine (polyaspartic acid ester). The poly-urea does not comprise non-chiral mono-amine and only polyamines, because of which this polyurea is in fact a polymer resin for use as a structural engineering resin.

With chiral mono-amine is meant an amine covalently bonded to a carbon atom, which carbon atom has three different substituents such that it is chiral. Also for the chiral mono-amines in principle a wide range of different mono-amines can be used. Preferably, the chiral mono-amines are amines having on the carbon atom next to the amine group one hydrogen atom and two different substituents $R^2$, and $R^3$. Suitable chiral mono-amines are for example described in not pre-published application EP2004/007597 and EP2004/007602, which are herewith enclosed by reference.

Preferably, the polyurea compound according to the invention is obtainable by reacting one or more polyisocyanates with a mixture of non-chiral mono-amines of the formula (I) and chiral mono-amines of the formula (II), wherein the mixture comprises 2-98 mole % of chiral mono-amine II, wherein each of $R^1$ to $R^3$ are independently selected from the group consisting of linear or branched, substituted or unsubstituted, saturated or unsaturated hydrocarbyl or a heteroatom containing group, whereby $R^2$ and $R^3$ of each chiral mono-amine II is different such that the carbon atom in mono-amine II is a chiral center.

It is believed that in the polyurea compound according to the invention that compounds substituted with chiral mono-amine co-crystallise with compounds substituted with non-chiral mono-amine. It has been found that optimum results can be obtained if the substituent $R^1$ of mono-amine I is substantially isomorphous with $R^3$ of mono-amine II and $R^2$ is an alkyl, aryl or heteroatom containing group, preferably comprising 1 to 6 atoms. Preferably, $R^2$ is a methyl group.

It is noted that Formula I and Formula II reflect the general chemical structure and do not reflect a particular enantiomers structure of the chiral mono-amine II. Chiral mono-amine II can be a mixture of enantiomers of chiral mono-amine II.

With "Substantially isomorphous" is meant that the size and shape of the substituents $R^1$ of mono-amine I and $R^3$ of mono-amine II are substantially the same. It is emphasized that these substituents do not need to be identical and that the advantages of the polyurea compound according to the invention can also be obtained, albeit at a lower level, if there is a substantial difference in size and shape of the substituents. The skilled man can on the basis of the description determine without undue experimentation which combination of substituents $R^1$ of mono-amine I and R3 of mono-amine II result in high rheology modification efficiency.

Good results can be obtained if in the polyurea compound according to the invention $R^1$ of mono-amine I and $R^3$ of mono-amine II comprise approximately the same number of atoms or if $R^1$ of mono-amine I and $R^3$ of mono-amine II both comprise an aryl group having approximately the same number of atoms in the aryl group, or wherein $R^1$ of mono-amine I and $R^3$ of mono-amine II comprise an alkyl or hetero alkyl group having approximately the same number of atoms.

With approximately here is meant the same number of atoms plus or minus two atoms or plus or minus 25%. Most preferably, the number of atoms in $R^1$ of mono-amine I and $R^3$ of mono-amine II are the same. Suitable combinations are methyl/ethyl than all, Preferably, $R^1$ of mono-amine I and of chiral mono-amine II comprise the same basic aryl, alkyl or heteroatom containing group optionally with different substituents. The substituents preferably are small, preferably methyl, ethyl, or methoxy groups. The substituents may differ in type or in position on them basic aryl, alkyl or heteroatom containing group. In the most preferred embodiment of the polyurea compound according to the invention $R^1$ of mono-amine I and of chiral mono-amine II are identical.

In a preferred embodiment of the polyurea compound according to the invention, chiral mono-amine II is alpha-methylbenzylamine (AMBA) or an aminoacid, optionally esterified. In a preferred embodiment, mono-amine I is benzyl amine (BA) and chiral mono-amine II is alpha-methylbenzylamine (AMBA). In another preferred embodiment $R^1$ in mono-amine I and/or $R^3$ chiral mono-amine II is a -pyridyl moiety. In yet another embodiment mono-amine I is 3-aminomethylpyridine (AMP) and chiral mono-amine II is alpha-methylbenzylamine (AMBA).

In the polyurea compound 2-98 mole % (relative to the total amount of mono-amines) are chiral mono-amines. The chiral mono-amine content is preferably at least two mole percent to achieve significantly improved rheology modification, in particular to achieve significantly reduced compliance and/or to achieve in improved high-temperature flow. Preferably, the content is at least 5%, more preferably at least 10%. At chiral mono-amine contents above 50% the additional improvement in rheology is relatively small. The chiral mono-amine content preferably is below 98%. Too high chiral mono-amine content may result in a too low melting temperature and a reduced shelf life of sag control agent compositions comprising the polyurea compound. Further, in view of the higher cost of chiral mono-amines, the content is preferably not unnecessarily high. Preferably, the mono-amine content is below 90%, more preferably below 80%, even more preferably below 70% and most preferably below 55%. The melting (dissolution) temperatures of the polyurea compounds in their application environment can be tuned with the ratio of mono-amine I and mono-amine II to create the desired amount of high temperature flow; this optimum ratio will depend on the exact application method, and the polyisocyanate used.

It is preferred that in the polyurea compound according to the invention mixture the content of chiral mono-amine II (relative to the total mono-amine content) is between 5 and 80 mole %, more preferably between 7 and 70 mole % and most preferably between 10 and 55 mole %.

It is to be understood that any enantiomer mixture of type II mono-amines can be used to make a polyurea compound according to the invention. Good results can even be obtained if the chiral mono-amine II is a racemic mixture of enantiomers. It is however preferred that in the polyurea compound according to the invention chiral mono-amine compound II is provided in a significant enantiomeric excess. The term "enantiomeric excess", hereinafter also referred to as "ee", is used to indicate the excess of one enantiomer over racemic material in a sample that comprises both enantiomers of the chiral mono-amine II. The enantiomeric excess is expressed as a percentage. A racemic sample, i.e. a 50:50 mixture of both enantiomers, has an ee of 0% and an enantiomerically pure sample has an ee of 100%. It is noted that optimum results are usually obtained at higher ee values, but not necessarily at 100%. The ee is preferably at least 10% (as in 55:45 ratio), more preferably at least 20% (as in 60:40 ratio), even more preferably at least 40% (as in 70:30 ratio), and most preferably at least 50% (as in 75:25 ratio) are even at least 80%.

The invention further relates to a blended polyurea compound comprising a physical blend of two or more different polyurea compounds having different melting temperatures, The high-temperature flow properties of a coating compositions can be improved by adding to a temperature resistant polyurea compound an adequate amount of a polyurea compound having a lower melting temperature. As described above a different melting temperature can be achieved by choosing the appropriate type of mono-amine and polyisocyanate components and/or more preferably by choosing a different chiral mono-amine content. Preferably, in such a blended polyurea compound at least one of the polyurea compounds is a polyurea compound according to the invention as described above. Even more preferably the blended polyurea compound comprises two polyurea compounds according to the invention with different melting temperatures and preferably with different chiral mono-amine contents

In the chiral mono-amine, the substituents on the carbon adjacent to the amine group are independently selected from hydrogen, linear or branched, substituted or unsubstituted, saturated or unsaturated hydrocarbyl or hetero atom containing group, including substituted or unsubstituted phenyl or naphthyl, whereby each of the substituents is different such that the carbon atom is a chiral centre.

In case the substituent is a hydrocarbyl, it is preferably independently selected from the group consisting of linear, cyclic or branched, substituted or unsubstituted, saturated or unsaturated, optionally hetero atom-containing, $C_1$-$C_{25}$ alkyl, aryl, aralkyl, and alkenyl, fulfilling the above-mentioned provisos.

In a preferred embodiment according to formula II, the substituents $R^2$, and $R^3$ are independently selected from one of the above-indicated $C_1$-$C_{25}$ groups. Optionally, two of $R^1$, $R^2$, and $R^3$ can be taken together with the carbon atom to which they are attached and form a substituted or unsubstituted ring containing 4 to 8 carbon atoms. If present, the substituents are preferably selected from the group consisting of alkyl, alkoxy, hydroxy, (preferably non-primary) amine, phosphonic acid, phosphonic ester, keto, ketimine, urethane, allophanate, amide, and urea groups, most preferably the substituents are selected from alkyl or alkoxy groups. If one or more of the substituents is a hetero atom-containing $C_1$-$C_{25}$ group, it is preferably in the form of an ether unit.

In one preferred embodiment the chiral mono-amine is selected from compounds of the formulae

IV)

V)

wherein R is a linear or branched, substituted or unsubstituted, saturated or unsaturated hydrocarbyl. If present, the substituents on R are preferably selected from the group consisting of hydroxy, amine, carboxylic acid, phosphonic acid, keto, ketimine, amine, ether, urethane, allophanate, urea, and isocyanurate groups. Preferably, R is selected from the group consisting of linear or branched, substituted or unsubstituted, saturated or unsaturated $C_1$-$C_{25}$ alkyl, aryl, aralkyl, and alkenyl. More preferably, R is a linear or branched $C_1$-$C_{25}$ alkyl. Even more preferably R is linear or branched $C_1$-$C_5$ alkyl. Most preferably R is a methyl or ethyl group.

In another preferred embodiment the chiral mono-amine is selected from the group consisting of alpha-methylbenzylamine, alpha-methyl(4-methyl)benzylamine, 1,1-(1-naphtyl)aminoethane, alpha-methyl(4-methoxy)benzylamine, 1,1-(2-naphtyl)aminoethane, 2-amino, 3-methylbutane, 1-phenyl, 1-amino, 5-diethylaminopentane, 1-indyl, 1-aminoethane, 3,3-dimethyl, 2-aminobutane, 2-aminoheptane, 3-methoxy-2-aminopropane, 1-cyclohexyl, 1-aminoethane, 1-amino, 1-(1-tetrahydronaphyl)ethane, 3-benzyloxy, 2-aminopropane, 1-benzyloxy, 2-aminobutane, 3-phenoxy, 2-aminopropane, 1-amino, 2-benzyloxy cyclopentane, 1-amino, 2-benzyloxycyclohexane, 1-amino, 1-(4-methoxyphenyl)butane and 1-amino, 1-(4-methoxyphenyl)propane, said compounds having the respective formulae:

and (S/R)-2-amino-hexane and (S/R)-1-phenylpropylamine.

The chiral mono-amine can also be optically active amino acids, esters and/or salts thereof of the formula (AA)

$$H_2N-\underset{R_2}{\overset{R_1}{C^*}}-COOR_3,$$

wherein each of $R_1$, $R_2$, and $R_3$ is independently selected from hydrogen and linear, cyclic, or branched, substituted or unsubstituted, saturated or unsaturated hydrocarbyl, or heteroatom containing group, with each of $R_1$ and $R_2$ being different such that the carbon atom C* is a chiral centre. Hereinafter, "amino acids, esters and/or salts thereof" are also referred to as "amino acid derivatives".

If $R_1$ and/or $R_2$ of formula (AA) is a hydrocarbyl, the hydrocarbyl is preferably independently selected from the group consisting of linear, cyclic or branched, substituted or unsubstituted, saturated or unsaturated, optionally hetero atom-containing $C_1$-$C_{24}$ alkyl, aryl, aralkyl, and alkenyl, fulfilling the above-mentioned provisos, more preferably selected from the group consisting of linear or branched $C_1$-$C_{24}$ alkyl, even more preferably from the group consisting of linear or branched $C_1$-$C_4$ alkyl, and most preferably the hydrocarbyl is a methyl or ethyl group.

In the preferred embodiment of the chiral mono-amine according to Formula II, one substituent is hydrogen and the other is a hydrocarbyl selected from one of the above-indicated $C_1$-$C_{25}$ groups. If the substituent is a hetero atom-containing $C_1$-$C_{25}$ group, it is preferably in the form of an ether unit. Optionally, the substituents can be taken together with the chiral carbon atom C* to which they are attached and form a substituted or unsubstituted ring containing 4 to 8 carbon atoms, provided that said ring is such that chirality at the carbon atom C* is maintained.

If present, the substituents on $R_1$ and/or $R_2$ in the amino acid and on the above-mentioned ring are preferably selected from the group consisting of alkyl, aryl, alkoxy, hydroxy, (preferably non-primary) amine, carboxylic acid, ester, phosphonic acid, phosphonic ester, keto, ketimine, urethane, allophanate, amide, thiol, imidazole, indole, guanidine, alkyl sulphide, and urea groups, most preferably from alkyl or alkoxy groups.

If R3 in the amino acid formula AA is a hydrocarbyl as defined above, it is preferably selected from the group consisting of linear, cyclic or branched, substituted or unsubstituted, saturated or unsaturated, optionally hetero atom-containing C1-C25 alkyl, aryl, aralkyl, and alkenyl; more preferably, R3 is selected from the group consisting of linear or branched, substituted or unsubstituted, optionally hetero atom-containing C1-C25 alkyl, even more preferably from the group consisting of linear or branched, substituted or unsubstituted C1-C8 alkyl, ether and/or, optionally esterified C1-C8 (poly)alkoxy, and most preferably from the group consisting of linear C1-C4 alkyl and, optionally alkoxylated, linear C1-C4 alkoxy. If alkoxylated, it is preferred to use ethoxylated, propoxylated, and/or butoxylated compounds. If present, the substituents on R3 are preferably selected from the group consisting of monoether alcohol and alkoxylated compounds.

In a preferred embodiment the chiral mono-amine is an active amino acid derivatives preferably in their naturally occurring configuration, selected from the group consisting of: alanine (Ala), amino butyric acid (Abu), arginine (Arg), asparagines (Asn), aspartic acid (Asp), cysteine (Cys), glutamic acid (Glu), glutamine (Gln), histidine (His), homocysteine (Hcy), isoleucine (Ile), leucine (Leu), lysine (Lys), methionine (Met), norleucine (Nle) norvaline (Nva), ornithine (Orn), phenylalanine (Phe), serine (Ser), threonine (Thr), tryptophan (Trp), tyrosine (Tyr), valine (Val), ester derivatives and salts thereof.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted arylene, aralkylene, and cyclohexylene polyisocyanates. The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are preferably selected from the group consisting of tetramethylene-1,4-diisocyanate, hexamethylene-1,6-diisocyanate (HMDI), trans-cyclohexyl-1,4-diisocyanate, dicyclohexylmethane-4,4'-diisocyanate, 1,5-dimethyl-(2,4-ω-diisocyanato methyl) benzene, 1,5-dimethyl(2,4-ω-diisocyanatoethyl) benzene, 1,3,5-trimethyl(2,4-ω-diisocyanatomethyl) benzene, 1,3,5-triethyl(2,4-ω-diisocyanatomethyl) benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT, and polyisocyanates known as "polymeric MDI". Polymeric MDI typically is a mixture of pure MDI and oligomers of MDI. Particularly preferred polyisocyanates are selected from the group consisting of HMDI, its isocyanurate trimer, its biuret, trans-cyclohexyl-1,4-diisocyanate, para- and meta-xylylene diisocyanate, and toluene diisocyanate. Most preferably, HMDI is selected.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention Throughout this document the term "polyisocyanate" is used to denominate all polyisocyanates and polyisocyanate-generating compounds.

The ratio of the number of amino groups of the amino compounds to the number of (generated) isocyanate groups may be in the range of 0.7 to 1.5. Preferably, the ratio is about 0.9 to 1.1.

The reaction between the isocyanate and the mono-amine components can be carried out in any arbitrarily chosen way by combining the reaction components, optionally at elevated temperature, as will be clear to a person skilled in the art. It is preferred that the reaction is carried out at temperatures in the range of 0° C. to 150° C., more particularly in the range of 20° C. to 80° C. Although in general the reaction components are combined in any arbitrarily chosen manner, preferably the isocyanate is added to the mono-amine components, which may be done in several steps, if desired. Optionally, the reaction may be carried out in the presence of an inert solvent, for example acetone, methyl isobutyl ketone, N-methyl pyrrolidone, benzene, toluene, xylene, or an aliphatic hydrocarbon such as petroleum ether, alcohols, and water, or mixtures thereof. Here the term "inert" indicates that the solvent does not significantly interfere in the process of polyurea formation, which means that the amount of polyurea formed when solvent is present is at least 80% of the amount produced when no solvent is present.

The preparation of the polyurea compounds, hereafter also referred to as rheology modification agent, optionally may also be carried out in the presence of a binder. This can be done by mixing a mixture of the binder and the isocyanate with the amine components or by mixing the isocyanates with a mixture of the binder and the amine components, or by mixing two mixtures of binder with amine components and NCO-components, respectively. It will be obvious that if the binder is highly reactive with either the amines or the isocyanate, the binder and that particular susceptible compound cannot be premixed. By the term "highly reactive" is meant here that more than 30% of the susceptible amino acid derivative or isocyanate reacts with the binder before the amino acid derivative and the isocyanate are mixed in order to prepare the rheology modification agent. The mixing operation may be carried out in any convenient manner, with the reactants being vigorously stirred, in a batch or in a continuous process. Amine components may be added to isocyanate or isocyanate may be added to amine components, whichever is most convenient. If a binder is used and either the amine components or the isocyanate is highly reactive with the binder, then the compound that is most reactive with the binder is preferably added to the mixture of the binder with the compound that is least reactive with the binder.

In one embodiment of the invention, the polyurea compounds are produced in the binder or curing component of the final coating composition in such a low concentration, preferably 0.1-8%, that the binder dispersion can still be handled as a fluid and can be subsequently used in the coating composition, optionally using further binder, curing component and/or other (conventional) additives. When the rheology modification agent is produced in the binder, it is preferably prepared at a temperature in the range of 20-80° C., under adequate stirring.

The invention further relates to the use of a polyurea compound as described above as a rheology modification agent, in particular in adhesives, printing inks, detergents, paper, paperboard, textiles, construction materials, engineering plastics, pigments, mining fluids, or cosmetics. The most important use of the polyurea compound is as a sag control agent in a coating composition.

The invention further also relates to a coating composition comprising a binder and, as a sag control agent, a polyurea compound or a sag control agent composition according to the invention. The coating composition preferably comprises between 0.05 and 10 wt percent of the polyurea compound (based on the total solids weight of the coating composition). The invention also relates to a coating prepared from a coating composition according to the invention. These coatings have a more homogeneous thickness, less sag and a better optical appearance The coating composition is prepared by mixing the polyurea compound, the binder and optional other coating composition components, most preferably in the form of a master batch of a sag control agent composition comprising a polyurea compound according to the invention dispersed in a binder material. The composition of that master-batch comprises a binder, a solvent and 0.1 to 10 wt %, preferably 0.2 to 7 wt % and most preferably between 0.5 to 5 wt % (relative to the total solid weight of the composition) of the polyurea compound, which is dispersed in the binder. The binder content preferably is between 50 and 80 wt % (relative to the total weight of the composition). This master batch SCA composition can be handled as a fluid and can easily be mixed with a coating composition.

The polyurea compound can also be added to a coating composition in various different ways. For example, the polyurea compound can be precipitated and separated and then mixed into a coating composition as a dry powder. Alternatively, the polyurea compound can be added to a coating composition in a dissolved state preferably as a concentrated, if necessary warm, solution, for example using N Methyl pyrrolidone (NMP), butanol or acetic acid as a solvent, optionally along with adjuvant materials followed by precipitation of the polyurea compounds in the coating composition. As a result a fine dispersion is obtained.

In another embodiment of the preparation of the rheology modification agent, the binder is mixed with such amounts of the isocyanate and the amine components that, upon conclusion of the reaction, a mixture is obtained as a solid-like material, which can be used as master batch of the rheology modification agent, consisting of 5-99, preferably 6-50, more preferably 7-25, parts by weight of the rheology modification agent relative to 95-1, preferably 94-50, more preferably 93-75, parts by weight of the binder. Optionally, further diluents or adjuvants may be present. The binders in the final coating composition and in the master batch of the rheology modification agents may be of the same or different composition.

Although it is less desired, binder or curing compositions comprising the rheology modification agent may also be prepared or modified in the presence of said rheology modification agent or by preparing the binder or curing compound as well as the rheology modification agent at the same time. The skilled person will have no problem combining the rheology modification agent, or the starting materials for a rheology modification agent, with the starting materials for the binder or curing compound, with subsequent reaction to form the rheology modification agent-containing binder or curing compositions.

The invention further relates to coating compositions comprising a binder and the rheology modification agent according to the invention. When the rheology modification agent is used to formulate coating compositions, the resulting coating compositions show an improved rheology, here dubbed thixotropic, and may have an opaque, opalescent or even transparent appearance, depending on the size and the refractive index of the dispersed particles of the rheology modification agent.

Optionally, conventional additives may be present in any of the coating compositions of the present invention, such as other co-binders, crosslinking agents, solvent and/or dispersing additives, pigment dispersants, dyes, pigments, nanoparticles, UV curing additives, flow additives, other rheology control additives, solvents, and accelerators for the curing reaction, for instance acidic compounds such as p-toluene sulphonic acid or blocked products thereof. The coating compositions may comprise other conventional rheology modification agents which may be solvent based or solvent-less. In another embodiment, the liquid other conventional rheology modification agents are water based.

The thixotropic coating compositions may be applied to a substrate in any desired manner, for instance by rolling, pneumatic or electrostatic spraying, brushing, sprinkling, casting, and dipping.

The degree to which the rheology is changed, depends, inter alia, on the proportion and the nature of the polyurea compound and the components of the composition and which the polyurea compound is used as rheology modification agent. As a rule, the desired degree of thixotropy may be obtained by employing the rheology modification agent preferably in an amount of at least 0.01%, more preferably at least 0.05%, even more preferably at least 0.10%, and most preferably at least 0.15%, and preferably of at most 30%, more preferably at most 10%, even more preferably at most 3%, and most preferably at most 1.5%, based on the total weight of the composition.

The thixotropic compositions according to the invention may contain polar and/or non-polar solvents. Preferably, the thixotropy is present not only at room temperature but also at elevated temperature, so that the rheology modification agent according to the invention is suitable for use at room temperature and in baking paints (curing), for instance in the range of 50° C. to 250° C., preferably less than 165° C. of 2 to 120 minutes.

The rheology modification agent used as an SCA according to the invention further has the considerable advantage that it does not or seldom decreases the gloss or brightness of the composition, especially for clear coats.

The rheology modification agents can be used in all kinds of thermoplastic and crosslinking coatings formulations; they are preferably used in coating compositions based on polyol-isocyanate curing (including all blocked isocyanates, and compounds as Cylink 2000 (® Cytec) in which OH functions can be exchanges at carbamate groups), polyol-curing with formaldehyde based crosslinkers (e.g. the melamine formaldehyde types commonly used), polycarbamates with formaldehyde based crosslinkers, sterically hindered amines (e.g. Desmophen® NH 1220, Desmophen® NH 1420, and Desmophen® NH 1521) with isocyanates, thiols with isocyanates, (meth)acryloyl based coating compositions, epoxy curable coating compositions (using acids, anhydrides or amines as crosslinker), and any systems combining more than one of these chemistries, the latter also referred to as hybrid curable coating compositions (e.g. acryloyl based systems integrated in an OH—NCO curing system). Other crosslinking chemistries that may be used in combination with the rheology control agents of the invention, are based on keto-functional binders, or acetoacetoxy functional binders, or binders than can cure through an oxidative mechanism (e.g. using unsaturated polyesters), or by a radical mechanism triggered by a thermal radical initiator, a photo-initiating system, or high energy radiation.

Next to coating applications, other applications in which the rheology control agents of the invention may be used in, are adhesives, printing inks, e.g. in screen printing applications or anti-misting applications, detergents and cleaning applications, paper and paperboard industries, textile, leather, and carpet applications, construction compounds, pigment compositions, mining and cosmetics

BRIEF DESCRIPTION OF THE DRAWINGS

The features and advantages of the invention will be appreciated upon reference to the following drawings, in which.

The invention will be illustrated by the Examples described below.

In the examples and comparative experiments described below, various sag control agents for coating compositions were prepared by reacting polyisocyanates and mono amines in the presence of a polyol binder (hereafter referred to as the polyol SCA mixture).

One-component (1K) polyol coating compositions were prepared by blending a polyol SCA mixture with an amount of unmodified polyol of the same nature, and an amount of US138 butylated melamine formaldehyde crosslinker, in a ratio of 70/30 by dry weight (polyol/melamine crosslinker), and diluted further with Solvesso 100 to a formulation with a high shear viscosity of 700 mPas; this is a viscosity level assumed to be typical of a paint being sprayed and arriving at the substrate. The amount of SCA reported is based on the amount of amine and isocyanate used, relative to total dry weight.

Two-component (2K) polyol coating compositions were prepared by blending a polyol SCA mixture with an amount of unmodified polyol of the same nature, an amount of Tolonate HDT isocyanate crosslinker, in a ratio to obtain a OH—NCO stoichiometry of 1. This mixture was diluted further with butylacetate to obtain a high shear viscosity of 700 mPas. The amount of SCA reported is that based on total dry weight.

The epoxy acid formulation was prepared by blending a relevant amount of epoxy-functional resin with SCA modification, with an amount of the same unmodified epoxy-functional resin, and a triacid solution prepared according to preparation C of EP 0275138 A2, in order to obtain a 1:1 stoichiometry and acid and epoxy groups. This formulation was diluted further with butylacetate to obtain a high shear viscosity of 700 mPas.

Compliance measurements were performed in a stress-controlled Rheometer, after short high shear treatment to break all rheological structure present, at a constant shear stress of 0.5 Pa, simulating gravitational effects on a vertical wet film of typical thickness. The compliance is considered proportional to the cumulative amount of flow exhibited by the wet film at room temperature.

EXAMPLE 1

(90/10) S/R-AMBA+BA+HDI in Setal® 166 SS-80

100.00 g of Setal® 166 SS-80 (80% polyester polyol in butylacetate/o-xylene) was added in a reactor, and mixed with 0.07 g (0.58 mmoles) of R-(+)-α-methylbenzylamine, 0.62 g (5.1 mmoles) S-(−)-α-methylbenzylamine and 0.61 g (5.7 mmoles) benzylamine, using a rotating disk dissolver at 1500 rpm for 5 minutes. The stirring speed was raised to 4000 rpm, and 0.99 g (5.9 mmoles) of 1,6-hexamethylenediisocyanate was added using a syringe. The mixture was stirred for an additional 30 seconds at 4000 rpm.

COMPARATIVE EXPERIMENT 1

BA+HDI in Setal® 166 SS-80

The SCA mixture was prepared as in example 1 except that 1.22 g (11.4 mmoles) of benzylamine was used as the monoamine component.

COMPARATIVE EXPERIMENT 2

(90/10) S/R-AMBA+HDI in Setal® 166 SS-80

The SCA mixture was prepared as in example one except that 0.14 g (1.2 mmoles) of R-(+)-α-methylbenzylamine and 1.16 g (9.6 mmoles) of S-(−)-alpha-methylbenzylamine were used as the amine component.

COMPARATIVE EXPERIMENT 3

Physical Blend of Comparative Experiment 1 and 2

50.00 g of the material from comparative experiment 2 was mixed with 50.00 g of material from comparative experiment 1 using a rotating disk dissolver at 500 rpm for 5 minutes.

Two polyol-isocyanate 2K formulations were prepared as described above comprising respectively 1.2 wt % and is 0.5 wt % of the polyurea compounds relative to the total solids weight of the coating compositions. Rheological compliance was measured as described above. The results are compared in Table 1. It can clearly be seen that the advantages in flash-off compliance that can be obtained using the high enantiomeric excess SAMBA-HDI based SCA relative to the conventional BA-HDI SCA, can be obtained to the same or even higher extent, by using a SAMBA-BA mixture to react with the HDI. The use of a physical blend of the two separate types of SCA's clearly yields different results, and cannot match the rheological effectiveness of the (S)AMBA-BA mixed amine SCA.

TABLE 1

| | compliance after 100 s 0.5 Pa (1/Pa) |
|---|---|
| Setal® 166 1.2% SCA 2K formulation based on | |
| example 1: SAMBA-BA mixed | 1.9 |
| Comparative experiment 1: BA-HDI | 93 |
| Comparative experiment 2: SAMBA (80% ee)-HDI | 2.5 |
| Comparative experiment 3: blend of comparative experiments 1 and 2 | 12 |
| 0.5% SCA 2K formulation based on | |
| example 1: SAMBA-BA mixed | 28 |
| Comparative experiment 1: BA-HDI | 135 |
| Comparative experiment 2: SAMBA (80% ee)-HDI | 28 |
| Comparative experiment 3: blend of comparative experiments 1 and 2 | 91 |

Figure 2:
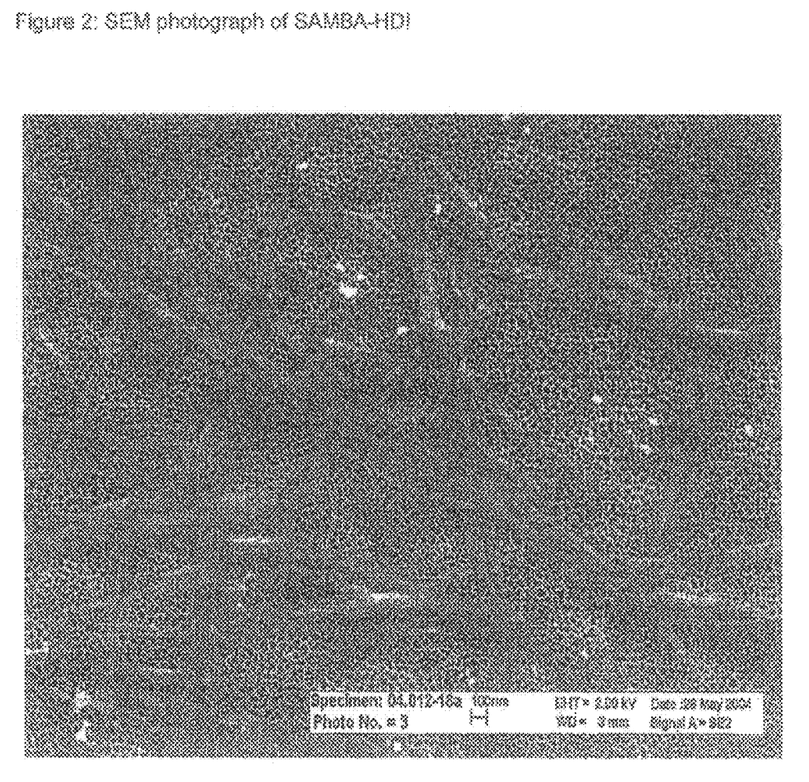
FIG. 2 shows an SEM photograph of SAMBA-HDI, as a comparative example.
Figure 3:
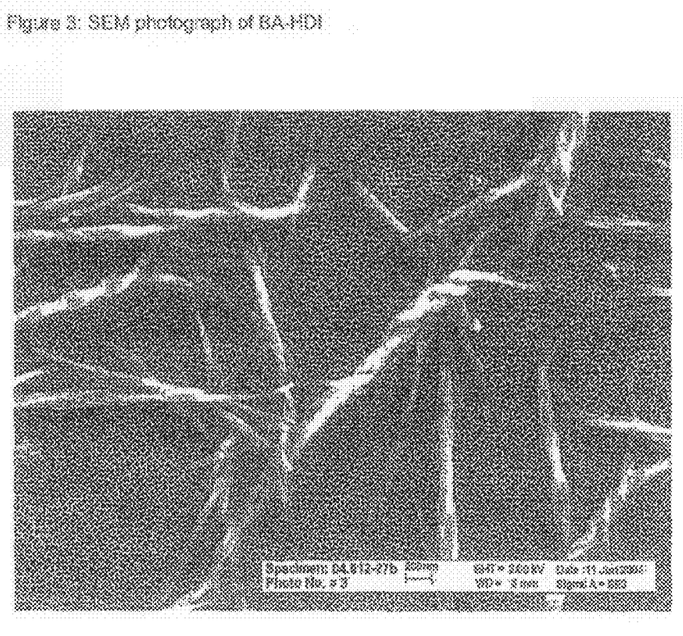
FIG. 3 shows an SEM photograph of BA-HDI, as a comparative example.
Figure 4:
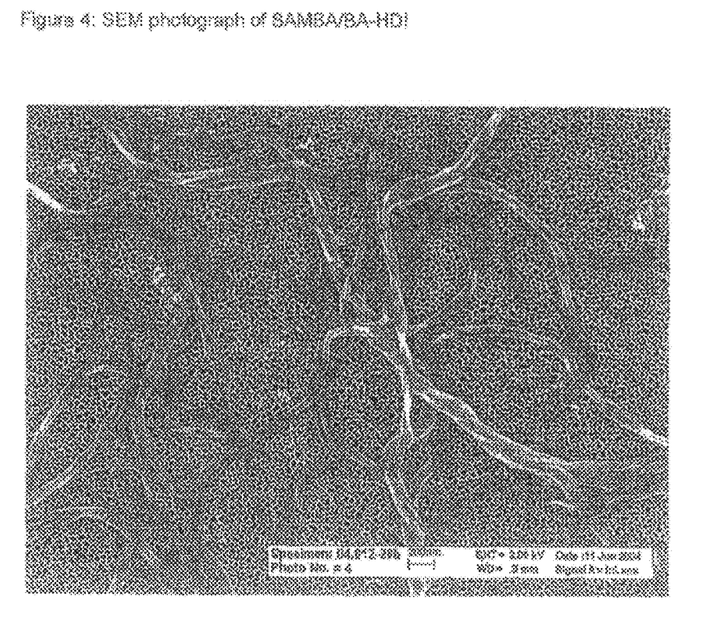
FIG. 4 shows an SEM photograph of SAMBA/BA-HDI according to an embodiment of the present invention.

SEM pictures of these materials in FIGS. 2 to 4 illustrate that the mixed amine SCA (FIG. 4) has a different morphology from both the BA-HDI (FIG. 3), as well as the SAMBA-HDI (FIG. 2), indicating that actual cocrystallization occurs.

EXAMPLE 2

S-AMBA+BA (25:75)+HDI in Setal® 166 SS-80

100.0 g of Setal® 166 SS-80 was added in a reactor, and mixed with 0.33 g (2.7 mmoles) S-(−)-α-methylbenzylamine and 0.90 g (8.4 mmoles) benzylamine, using a rotating disk dissolver at 1500 rpm for 2 minutes. The stirring speed was raised to 400 rpm, and 0.97 g (5.77 mmoles) of 1,6-hexamethylene-diisocyanate was added using a syringe. The mixture was stirred for an additional 30 seconds at 4000 rpm.

EXAMPLE 3

S-AMBA+BA(20:80)+HDI in Setal® 166 SS-80

The SCA mixture was prepared as in Example 2, except that 0.25 g (2.1 mmoles) S-(−)-α-methylbenzylamine and 0.99 g (9.2 mmoles) benzylamine was used.

EXAMPLE 4

S-AMBA+BA (10:90)+HDI in Setal® 166 SS-80

The SCA mixture was prepared as in Example 2, except that 0.14 g (1.2 mmoles) S-(−)-α-methylbenzytamine and 1.10 g (10.3 mmoles) benzylamine was used.

EXAMPLE 5

S-AMBA+BA(5:95)+HDI in Setal® 166 SS-80

The SCA mixture was prepared as in Example 2, except that 0.07 g (0.6 mmoles) S-(−)-α-methylbenzylamine and 1.17 g (10.9 mmoles) benzylamine was used.

COMPARATIVE EXPERIMENT 4

BA+HDI in Setal® 166 SS-80

The SCA mixture was prepared as in example 2, except that 1.22 g (11.4 mmoles) S-(−)-α-methylbenzylamine was used as the amine component.

Polyol-isocyanate 2K formulations were prepared as described above, and rheological compliance was measured. The results are compared in Table 2. This table clearly shows that even small amounts of SAMBA co-reacting in a dominantly BA based SCA, already give significant advantages in flash-off sagging.

TABLE 2

| Setal® 166 0.5% SCA 2K formulation based on | compliance after 100 s 0.5 Pa (1/Pa) |
|---|---|
| Example 2: SAMBA-BA mixed 25-75 | 29 |
| Example 3: SAMBA-BA mixed 20-80 | 44 |
| Example 4: SAMBA-BA mixed 10-90 | 76 |
| Example 5: SAMBA-BA mixed 5-95 | 102 |
| Comparative experiment 4: SAMBA-BA 0-100 | 135 |

EXAMPLE 6

S-AMBA+BA(1:1)+HDI in Setalux® 1770 VS-70

100.00 g of Setalux® 1770 VS-70 (a 70% thermosetting hydroxylated acrylic resin in solvesso 100/butylacetate) was added in a reactor, and mixed with 0.56 g (4.6 mmoles) S-(−)-α-methylbenzylamine and 0.53 g (4.9 mmoles) benzylamine, using a rotating disk dissolver at 1500 rpm for 2 minutes. The stirring speed was raised to 400 rpm, and 0.83 g (4.9 mmoles) of 1,6-hexamethylenediisocyanate was added using a syringe. The mixture was stirred for an additional 30 seconds at 4000 rpm.

COMPARATIVE EXPERIMENT 5

S-AMBA+HDI in Setalux® 1770 VS-70

The SCA mixture was prepared as in Example 6, except that 1.13 g (9.3 mmoles) S-(−)-α-methylbenzytamine was used as the amine component.

COMPARATIVE EXPERIMENT 6

BA+HDI in Setalux® 1770 VS-70

The SCA mixture was prepared as in Example 6, except that 1.07 g (10.0 mmoles) benzylamine was used as the amine component.

EXAMPLE 7

S-AMBA+BA(1:1)+HDI in Setalux® 1715 VX-74

The SCA mixture was prepared as in Example 6, except that 100.00 g of Setalux® 1715 VX-74 (a 74% saturated polyester polyol resin in solvesso 100/o-Xylene) was used as the binder.

COMPARATIVE EXPERIMENT 7

S-AMBA+HDI in Setalux® 1715 VX-74

The SCA mixture was prepared as in Example 7, except that 1.19 g (9.82 mmoles) S-(−)-α-methylbenzylamine was used as the amine component.

COMPARATIVE EXPERIMENT 8

BA+HDI in Setalux® 1715 VX-74

The SCA mixture was prepared as in Example 7, except that 1.13 g (10.5 mmoles) benzylamine was used as the amine component.

EXAMPLE 8

S-AMBA+BA(1:1)+HDI in Setalux® 1757 VV-70

The SCA mixture was prepared as in Example 7, except that 100.00 g of Setalux® 1757 VV-70 (a 70% thermosetting hydroxylated acrylic copolymer in Solvesso 100) was used as the binder.

COMPARATIVE EXPERIMENT 9

S-AMBA+HDI in Setalux® 1757 VV-70

The SCA mixture was prepared as in Example 8, 1.13 g (9.32 mmoles) S-(−)-α-methylbenzylamine was used as the amine component.

COMPARATIVE EXPERIMENT 10

BA+HDI in Setalux® 1757 VV-70

The SCA mixture was prepared as in Example 8, except that 1.06 g (9.9 mmoles) benzylamine was used as the amine component.

EXAMPLE 9

S-AMBA+BA(1:1)+HDI in Setalux® 1760 VB-64

The SCA mixture was prepared as in Example 8, except that Setalux® 1760 VB-64 (a 64% thermosetting hydroxylated acrylic copolymer in solvesso 100/n-butanol) was used as the binder.

COMPARATIVE EXPERIMENT 11

S-AMBA+HDI in Setalux® 1760 VB-64

The SCA mixture was prepared as in Example 9, except that 1.03 g (8.5 mmoles) S-(-)-α-methylbenzylamine was used as the amine component.

COMPARATIVE EXPERIMENT 12

BA+HDI in Setalux® 1760 VB-64

The SCA mixture was prepared as in Example 9, except that 0.98 g (9.2 mmoles) benzylamine was used as the aim in component.

Coating formulations were prepared for the examples and comparative experiments based on Setalux® 1715, 1757, 1760 and 1770, using a Setamine® US138 butylated melamine formaldehyde crosslinker. Rheological compliance was measured, and the results are compared in table 3.

TABLE 3

| | compliance after 100 s 0.5 Pa (1/Pa) |
|---|---|
| Setalux ® 1770 1.2% SCA 1K formulation based on | |
| Example 6: SAMBA-BA 1:1 | 7.5 |
| Comparative experiment 5: SAMBA-HDI | 16 |
| Comparative experiment 6: BA-HDI | 112 |
| Setalux ® 1715 1.2% SCA 1K formulation based on | |
| Example 7: SAMBA-BA 1:1 | 5.1 |
| Comparative experiment 7: SAMBA-HDI | 16 |
| Comparative experiment 8: BA-HDI | 36 |
| Setalux ® 1757 1.2% SCA 1K formulation based on | |
| Example 8: SAMBA-BA 1:1 | 4.3 |
| Comparative experiment 9: SAMBA-HDI | 16 |
| Comparative experiment 10: BA-HDI | 48 |
| Setalux ® 1760 1.2% SCA 1K formulation based on | |
| Example 9: SAMBA-BA 1:1 | 9.0 |
| Comparative experiment 11: SAMBA-HDI | 32 |
| Comparative experiment 12: BA-HDI | 116 |

Table 3 shows that the advantages shown in Table 1 are quite universal, and can be extended to other polyester polyol and acrylic polyol resins, and to 1K type formulations based on a melamine formaldehyde crosslinker.

EXAMPLE 10A

S-AMBA+BA (1:1)+HDI in Setalux® 1767 VV-65

600.0 g of Setalux® 1767 VV-65 (a 65% acrylic polyol in solvesso 100) was added in a reactor, and mixed with 4.40 g (36.3 mmoles) S-(-)-α-methylbenzylamine and 4.18 g (39.0 mmoles) benzylamine, using a rotating disk dissolver at 1500 rpm for 5 minutes. The temperature was raised to 40° C. in these 5 minutes. Then the stirring speed was raised to 4000 rpm, and 6.52 g (38.8 mmoles) of 1,6-hexamethylene-diisocyanate was added using a syringe. The mixture was stirred for an additional 1 minute and 30 seconds at 4000 rpm.

EXAMPLE 10B

S-AMBA+BA (2:1)+HDI in Setalux® 1767 VV-65

The SCA mixture was prepared as in Example 10A, except that 5.90 g (48.7 mmoles) S-(-)-α-methylbenzylamine and 2.77 g (25.9 mmoles) benzylamine, was used as the amine component.

COMPARATIVE EXPERIMENT 13

S-AMBA+HDI in Setalux® 1767 VV-65

The SCA mixture was prepared as in Example 10A, except that 100.0 g of Setalux® 1767 VV-65 was added in a reactor, and mixed with 1.49 g (12.3 mmoles) S-(-)-α-methylbenzylamine is the aim in component.

COMPARATIVE EXPERIMENT 14

BA+HDI in Setalux® 1767 VV-65

The SCA mixture was prepared as in comparative experiment 13, except that 1.42 g (11.7 mmoles) benzylamine was used as the amine component.

Polyol-isocyanate 2K formulations were prepared of the Setalux® 1767 examples, and rheological compliance was measured. The results are compared in Table 4. Also in 2K formulations based on this acrylic polyol, the advantages can be observed.

TABLE 4 compliances 1767 in 2K formulation, including comparatives

| Setalux ® 1767 1.2% SCA 2K formulation based on | compliance after 100 s 0.5 Pa (1/Pa) |
|---|---|
| Comparative experiment 13: SAMBA-HDI | 26.4 |
| Comparative experiment 14: BA-HDI | 140 |
| Example 10A SAMBA-BA mixed 1:1/HDI | 8.4 |
| Example 10B SAMBA-BA mixed 2:1/HDI | 5.0 |

EXAMPLE 11

D,L-AMBA+BA(1:3)+HDI in Setal® 166 SS-80

100.0 g of Setal® 166 SS-80 (80% polyester polyol in butylacetateto-xylene) was added in a reactor, and mixed with 0.32 g (2.6 mmoles) of racemic (+/-)-α-methylbenzylamine and 0.91 g (8.5 mmoles) benzylamine, using a rotating disk dissolver at 1500 rpm for 5 minutes. The stirring speed was raised to 4000 rpm, and 0.97 g (5.77 mmoles) of 1,6-hexamethylene-diisocyanate was added using a syringe. The mixture was stirred for an additional 30 seconds at 4000 rpm.

EXAMPLE 12

D,L-AMBA+BA(1:1)+HDI in Setal® 166 SS-80

The SCA mixture was prepared as in Example 11, except that 0.64 g (5.3 mmoles) of racemic (+/−)-α-methylbenzylamine and 0.59 g (5.5 mmoles) benzylamine, was used as the amine component.

Polyol-isocyanate 2K formulations were prepared, and rheological compliance was measured. The results are compared in Table 5, and illustrate that advantages can also be obtained using a racemic mixture of alpha-methylbenzylamine, instead of a high enantiomeric excess mixture. The results of the high enantiomeric excess AMBA in this invention are more pronounced, though.

TABLE 5 racemic AMBA use

| Setal ® 166 1.2% SCA 2K formulation based on | compliance after 100 s 0.5 Pa (1/Pa) |
|---|---|
| example 1: SAMBA (80% ee)-BA mixed 1:1 | 1.9 |
| example 11: rac-AMBA-BA mixed 1:1 | 27 |
| example 12: rac-AMBA BA mixed 1:3 | 11 |
| comparative experiment 1: BA-HDI | 93 |

EXAMPLE 13

S-AMBA+BA(1:1)+HDI in Setalux® 8503 SS-60

100.0 g of Setalux® 8503 SS-60 (a 60% epoxy functional acrylic resin in butylacetate) was added in a reactor, and mixed with 0.69 g (4.1 mmoles) of 1,6-hexamethylene-diisocyanate, using a rotating disk dissolver at 1500 rpm for 2 minutes. The stirring speed was raised to 4000 rpm, and a mixture of 0.48 g (4.0 mmoles) S-(−)-α-methylbenzylamine and 0.45 g (4.2 mmoles) benzylamine was added using a syringe. The mixture was stirred for an additional 30 seconds at 4000 rpm.

COMPARATIVE EXPERIMENT 15

S-AMBA+HDI in Setalux® 8503 SS-60

The SCA mixture was prepared as in Example 13, except that 0.97 g (8.0 mmoles) S-(−)-α-methylbenzylamine was used as the amine component.

COMPARATIVE EXPERIMENT 16

BA+HDI in Setalux® 8503 SS-60

The SCA mixture was prepared as in Example 13, except that 0.92 g (8.6 mmoles) benzylamine was used as the amine component.

Formulations were prepared based on Setalux® 8503 in combination with a triacid crosslinker as specified above. Rheological results are compared in Table 6.

TABLE 6

8503/triacid compliance

| Setalux ® 8503 1.2% SCA 2K formulation based on | compliance after 100 s 0.5 Pa (1/Pa) |
|---|---|
| Example 13: SAMBA-BA mixed 1:1 | 4.2 |
| Comparative experiment 13: BA-HDI | 173 |
| Comparative experiment 14: SAMBA-HDI | Not tested, SCA dissolved |

The SAMBA-HDI based SCA appears to be very active in the Setalux® 8503, but dissolves upon formulation with the triacid crosslinker solution, leaving a Newtonian clear liquid. A conventional HDI-BA SCA in this formulation has a very low rheological activity, although its colloidal character remains intact.

EXAMPLE 14

S-AMBA+BA (1:3)+HDI in Setalux® 1757 VV-70

100.0 g of Setalux® 1757 VV-70 (a 70% thermosetting hydroxylated acrylic copolymer in solvesso 100) was added in a reactor, and mixed with 0.28 g (2.3 mmoles) S-(−)-α-methylbenzylamine and 0.80 g (7.5 mmoles) benzylamine, using a rotating disk dissolver at 1500 rpm for 2 minutes. The stirring speed was raised to 4000 rpm, and 0.85 g (5.0 mmoles) of 1,6-hexamethylenediisocyanate was added using a syringe. The mixture was stirred for an additional 30 seconds at 4000 rpm.

Formulations were prepared from the examples based on Setalux® 1757, in combination with a Setamine® US138 butylated melamine formaldehyde crosslinker, and tested in a so-called falling wave set-up. In this experiment, the displacement of an original surface profile due to gravitation pull can be followed as a function of time. These experiments include the effect of evaporation, as well as mimic a realistic flash-off time at room temperature, followed by a heating cycle. The wave displacement can be determined both in the flash-off period (5 minutes), as well as that during heating (up to 140° C., at an initial rate of 30° C./min): see FIG. 1.

Figure 1:
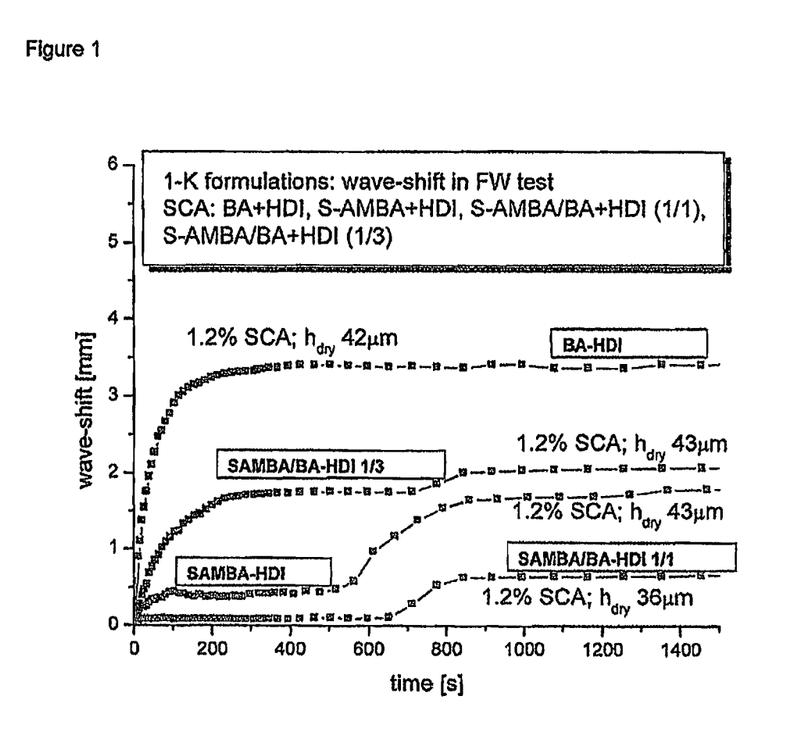
FIG. 1 shows wave-shift behaviour in a falling wave test of 1K formulations with the following sag control agents (SCA): BA-HDI (comparative), SMBA/BA-HDI 1/3 according to an embodiment of the present invention, SAMBA-HDI (comparative), and SAMBA/BA-HDI 1/1 according to an embodiment of the present invention.

It can be seen that the BA-HDI SCA exhibits quite a wave shift during the flash-off period, but no longer exhibits flow when the SCA structure is built: it remains intact in the oven. The SAMBA-HDI SCA, in contrast, only exhibits very little flow during flash-off, in line with the results of the compliance measurements used above. In the oven, due to the lowest melting point of this SAMBA-HDI SCA, the structure collapses, and some high temperature flow is allowed. It can be seen that the ratio flash-off flow vs. high T flow can be controlled by using the SAMBA-BA mixed amines, higher BA levels shifting this ratio towards the flash-off side. Thus, the use of these mixed amines to prepare SCA's can be a tool to create a tailor-made rheological behavior in the whole application-cure cycle.

EXAMPLE 15

S-AMBA+AMP(1:1)+HDI in Setalux® 1760 VB-64

100.0 g of Setalux® 1760 VB-64 (a 64% thermosetting hydroxylated acrylic copolymer in Solvesso 100/n-butanol) was added in a reactor, and mixed with 0.72 g (5.9 mmoles) S-(−)-α-methylbenzylamine and 0.69 g (6.4 mmoles) 3-(aminomethyl)pyridine, using a rotating disk dissolver at 1500 rpm for 2 minutes. The stirring speed was raised to 4000 rpm, and 1.07 g (6.36 mmoles) of 1,6-hexamethylenediisocyanate was added using a syringe. The mixture was stirred for an additional 30 seconds at 4000 rpm.

COMPARATIVE EXPERIMENT 17

AMP+HDI in Setalux® 1760 VB-64

The SCA mixture was prepared as in Example 15, except that 1.40 g (12.9 mmoles) 3-(aminomethyl)pyridine was used as the amine component.

COMPARATIVE EXPERIMENT 18

S-AMBA+HDI in Setalux® 1760 VB-64

The SCA mixture was prepared as in Example 15, except that 1.47 g (12.1 mmoles) S-(−)-α-methylbenzylamine was used as the amine component.

Coating formulations were prepared for the examples and comparative experiments based on Setalux® 1760, using a Setamine® US138 butylated melamine formaldehyde crosslinker. Rheological compliance was measured, and the results are compared in table 7 illustrating the advantages of example 15 in terms of flash-off compliance.

TABLE 7

| Setalux ® 1760 1.2% SCA 1K formulation based on | Compliance after 100 s 0.5 Pa (1/Pa) |
|---|---|
| Example 15: SAMBA-AMP mixed 1:1 - HDI | 7.7 |
| Comparative experiment 17: AMP-HDI | 93 |
| Comparative experiment 18: SAMBA-HDI | 26.5 |

EXAMPLE 16

L-alabu+BA(1:1)+HDI in Setalux® 1760 VB-64

The SCA mixture was prepared as in Example 15, except that 0.77 g (5.3 mmoles) L-alanine butylester and 0.69 g (6.4 mmoles) benzylamine was used as the amine component.

COMPARATIVE EXPERIMENT 19

L-alabu+HDI in Setalux® 1760 VB-64

The SCA mixture was prepared as in Example 16, except that 1.58 g (10.88 mmoles) L-alanine butylester was used as the amine component.

COMPARATIVE EXPERIMENT 20

BA+HDI in Setalux® 1760 VB-64

The SCA mixture was prepared as in Example 15, except that 1.40 g (13.1 mmoles) benzylamine was used as the aim in component.

Coating formulations were prepared for the examples and comparative experiments based on Setalux® 1760, using a Setamine® US138 butylated melamine formaldehyde crosslinker. Rheological compliance was measured. The results are compared in table 8, illustrating the relatively strong compliance limitation of the material of example 16.

TABLE 8

| Setalux ® 1760 1.2% SCA 1K formulation based on | Compliance after 100 s 0.5 Pa (1/Pa) |
|---|---|
| Example 16: L-alabu-BA mixed 1:1 - HDI | 43.6 |
| Comparative experiment 19: L-alabu-HDI | 13.6 |
| Comparative experiment 20: BA-HDI | 132 |

The invention claimed is:

1. A polyurea compound sag control agent obtainable by reacting one or more polyisocyanates with one or more non-chiral mono-amines (I) and one or more chiral mono-amines (II) and co-precipitating the reaction products to form the polyurea compound, wherein 2-98 mole % of the mono-amines in the polyurea compound are chiral mono-amines (II) provided in an enantiomeric excess of at least 20%.

2. The polyurea compound according to claim 1 obtainable by reacting one or more polyisocyanates with a mixture of non-chiral mono-amines of the formula (I) and chiral mono-amines of the formula (II), wherein the mixture comprises 2-98 mole % of chiral mono-amine II, wherein $R^1$ is selected from the group consisting of linear or branched, saturated or unsaturated hydrocarbyl and, each of $R^2$ to $R^3$ are independently selected from the group consisting of linear or branched, saturated or unsaturated hydrocarbyl or a heteroatom containing group, whereby $R^2$ and $R^3$ of each chiral mono-amine II is different such that the carbon atom in monoamine II is a chiral center.

3. The polyurea compound according to claim 1, wherein the polyisocyanates are selected from the group consisting of substituted or unsubstituted linear aliphatic polyisocyanates and substituted or unsubstituted arylene, aralkylene, and cyclohexylene polyisocyanates.

4. The polyurea compound to according to claim 2, wherein $R^1$ of mono-amine I is isomorphous with $R^3$ of monoamine II and $R^2$ is an alkyl, aryl or heteroatom containing group.

5. The polyurea compound to according to claim 2, wherein $R^2$ is a methyl group.

6. The polyurea compound according to claim 2, wherein $R^1$ of mono-amine I and $R^3$ of mono-amine II comprise the same number of atoms plus or minus two atoms or plus or minus 25%.

7. The polyurea compound according to claim 2, wherein $R^1$ of mono-amine I and $R^3$ of mono-amine II both comprise an aryl group, an alkyl or hetero alkyl group having the same number of atoms plus or minus two atoms or plus or minus 25%.

8. The polyurea compound according to claim 2, wherein $R^1$ of mono-amine I and $R^3$ of chiral mono-amine II comprise the same basic aryl, alkyl or heteroatom containing group optionally with different substituents.

9. The polyurea compound according to claim 2, wherein $R^1$ of mono-amine I and $R^3$ of chiral mono-amine II are identical.

10. The polyurea compound according to claim 1, wherein chiral mono-amine II is alpha-methylbenzylamine (AMBA).

11. The polyurea compound according to claim 1, wherein chiral mono-amine II is an aminoacid, optionally esterified.

12. The polyurea compound according to claim 1, wherein mono-amine I is benzyl amine (BA) and chiral mono-amine II is alpha-methylbenzylamine (AMBA).

13. The polyurea compound according to claim 1, wherein $R^1$ in mono-amine I and/or $R^3$ in chiral mono-amine II is a pyridyl group.

14. The polyurea compound according to claim 1, wherein mono-amine I is 3-(aminomethyl)pyridine (AMP) and chiral mono-amine II is alpha-methylbenzylamine (AMBA).

15. The polyurea compound according to claim 2, wherein the mixture comprises between 10 and 55 mole % of chiral mono-amine II.

16. A blended polyurea compound comprising a physical blend of two or more different polyurea compounds having different melting temperatures, wherein at least one of the polyurea compounds is a polyurea compound according to claim 1.

17. The blended polyurea compound according to claim 16, comprising two polyurea compounds with different melting temperatures.

18. The blended polyurea compound according to claim 17, wherein the two polyurea compounds differ in having a different chiral amine content.

19. A composition rheologically modified by the compound of claim 1 or blend of claim 16.

20. An adhesive, printing ink, detergent, paper, paperboard, textile construction material, engineered plastic, pigment, mining fluid or cosmetic comprising the polyurea compound of claim 1 or blend of claim 16 as a rehology modification agent.

21. A coating composition comprising the polyurea compound according to claim 1 or the blend of claim 16 as a sag control agent.

22. Sag control agent composition comprising a polyurea compound according to claim 1 dispersed in a binder material.

23. Sag control agent composition according to claim 22 for use as a master batch in the preparation of a coating composition, wherein the composition comprises a binder, a solvent and 0.5 to 7 wt % (relative to the total weight of the composition) of the polyurea compound.

24. A coating composition comprising a binder and, as a sag control agent, a polyurea compound according to claim 1 or a sag control agent composition according to claim 22.

25. The coating composition according to claim 24 comprising between 0.05 and 10 wt percent of the polyurea compound (based on the total weight of the coating composition).

26. A coating prepared from a coating composition according to claim 24.

27. A process for the preparation of a polyurea compound according to claim 1, wherein one or more polyisocyanates are reacted with a mixture of one or more non-chiral monoamines and one or more chiral mono-amines followed by precipitating the reaction products forming a solid co-precipitate polyurea compound.

28. A process for the preparation of a polyurea compound according to claim 1, wherein one or more polyamines are reacted with a mixture of one or more non-chiral monoisocyanates and one or more chiral mono-isocyanates followed by precipitating the reaction products forming a solid coprecipitate polyurea compound.

29. A process for the preparation of a polyurea compound according to claim 1, wherein one or more polyisocyanates are reacted with one or more non-chiral mono-amines in step A and wherein, in a separate step B, one or more polyisocyanates are reacted with one or more chiral mono-amines followed by combining the reaction products of step A and step B and precipitating the combined reaction products to form the solid coprecipitate polyurea compound.

30. The process according to claim 27 or 28, wherein the reaction step and the precipitation step are done in separate stages, wherein in a first stage, after the reaction step, a separate intermediate polyurea product is produced and wherein the intermediate polyurea product, in a later stage is compounded with other compounds to precipitate the polyurea compound.

31. A polyurea product sag control agent comprising polyurea compounds obtainable by reacting one or more polyisocyanates with one or more non-chiral mono-amines (I) and one or more chiral mono-amines (II) and co-precipitating the reaction products to form the polyurea compound, wherein 10-55 mole % of the mono-amines in the polyurea compound are chiral mono-amines provided in an enantiomeric excess of at least 20%, wherein the polyurea compounds are in a dissolved state for use in an application in which the dissolved polyurea compounds co-crystallize.

32. The polyurea compound to according to claim 2, wherein $R^2$ comprises 1-6 carbon atoms.

33. A polyurea compound sag control agent according to claim 1 wherein the non chiral amine (I) is an amine covalently bonded to a carbon atom, which carbon atom has two identical substituents such that it is not chiral and a substituent $R^1$ selected from the group consisting of linear or branched, saturated or unsaturated hydrocarbyl.

34. The polyurea compound to according to claim 33, wherein $R^2$ is a methyl group.

35. The polyurea compound according to claim 33, wherein $R^1$ of mono-amine I and $R^3$ of mono-amine II comprise the same number of atoms plus or minus two atoms or plus or minus 25%.

36. The polyurea compound according to claim 33, wherein R1 of mono-amine I and R3 of mono-amine II both comprise an aryl group, an alkyl or hetero alkyl group having the same number of atoms plus or minus two atoms or plus or minus 25%.

37. The polyurea compound according to claim 33, wherein R1 of mono-amine I and R3 of chiral mono-amine II comprise the same aryl, alkyl or heteroatom containing group, optionally with different substituents.

38. The polyurea compound according to claim 33, wherein R1 of mono-amine I and R3 of chiral mono-amine II are identical.

39. The polyurea compound according to claim 33, wherein the mixture comprises between 10 and 55 mole % of chiral mono-amine II.

* * * * *